Patented Apr. 15, 1930

1,755,069

UNITED STATES PATENT OFFICE

GERALD D. MALLORY, OF AKRON, OHIO, ASSIGNOR TO THE GOODYEAR TIRE & RUBBER COMPANY, OF AKRON, OHIO, A CORPORATION OF OHIO

PROCESS OF PROTECTING THE INTERIOR SURFACES OF AIR BAGS FROM DETERIORATION IN SERVICE

No Drawing.   Application filed November 18, 1927.   Serial No. 234,296.

My invention relates to methods of treating airbags employed in the vulcanization of pneumatic tires and it has, for its primary object, the provision of a solution which, when injected into an airbag, forms a protective coating over the interior surface thereof.

More specifically, my invention has, for one of its objects, the provision of a glycerine solution which forms a permanent inert coating within an airbag when injected therein.

It has been found that the surfaces of airbags of the type designated, tend to oxidize, becoming hard and brittle and, consequently, they crack or break after being employed in the vulcanization of a relatively few tires. It is customary to inject a quantity of glycerine from time to time into these bags, and the glycerine, to a certain extent, acts as a preservative, thus increasing the period of usefulness of the bags.

The glycerine employed is a relatively fluid material and has a tendency to flow to the lower portions of the bag, thereby leaving the upper portions exposed to the action of oxygen and other deteriorating agencies. It has been suggested that it might be possible to increase the life of the bags by injecting therein a viscous glycerine solution that would not flow readily. One such solution is obtained by extracting the glycerine from worn out airbags. The reclaimed glycerine thus obtained materially increases the life of a new airbag when injected therein. However, the supply and effectiveness of the material from this source is limited and it is desirable to improve the protective qualities thereof.

I have made the discovery that by incorporting inert pigments into a glycerine solution, a material is obtained which, when injected into airbags, forms a permanent protective coating over the interior surfaces thereof, thereby greatly increasing the period of usefulness of the bags. Numerous pigments may be employed for this purpose, examples of which are talc, chalk, barytes, gas black and "asbestine". The latter material is preferable to any of the others mentioned because it forms a more permanent suspension than the other pigments.

The mixture of glycerine and pigment may be very materially improved as a coating material for airbags by incorporating therein a small percent of thin pine tar. The tar being relatively viscous, considerably increases the viscosity of the glycerine and thereby prevents the pigments from settling. It also readily wets the pigments, thereby facilitating dispersion thereof and rendering the dispersion more stable. Other oils, such as rape seed oil, tung oil and coal tar, which readily wet the pigments, will also aid the dispersion of the pigments and will stabilize the suspension. These oils may, therefore, be substituted for pine tar. It is also a rubber softener and tends to maintain the interior of the bag in a soft and pliable condition.

Beneficial results are obtained by incorporating in the mixture a small amount of zinc oxide, preferably from four to eight per cent. The presence of the zinc oxide in the glycerine solution prevents the absorption of the zinc oxide which is employed as a filler and as an accelerator in the rubber compound from which airbags are manufactured.

A material sufficiently viscous to form a permanent coating over the interior of the bags cannot be readily injected through the air valves and it cannot be readily distributed over the surfaces to be protected. It is, therefore, desirable to add a quantity of water or other inert liquid of a sufficiently low boiling point that it will evaporate when the bags are heated, thus leaving the interior thereof permanently and evenly coated.

The solution may be injected into the bags either before or after they are cured, though, preferably it is injected before curing. It then serves to protect the interior surfaces of the bag while they are being vulcanized.

The following is an example of a formula which results in a compound which may be employed in airbags with very satisfactory results:

|            | Parts by weight |
|------------|----------------:|
| Glycerine  | 61.8 |
| Zinc oxide | 6.4 |
| Pine tar   | 2.6 |
| Asbestine  | 29.2 |
| Water      | 10.0 |

A material prepared according to this formula is a creamy fluid which may be readily injected into airbags and which soon thickens when heated, thereby providing a permanent, inert coating over the interior surfaces of the airbags. It is, of course, to be understood that the relative proportions of the various ingredients may be varied within relatively wide limits and yet retain many of the advantages obtained from the specific formula.

It will be apparent from the foregoing description that I have discovered a relatively simple means for increasing the efficiency of glycerine solutions employed as preservatives in airbags.

Although I have disclosed only the preferred form which my invention may assume and described the application of that form in detail, it will be apparent to those skilled in the art that it is not so limited but that various minor modifications may be made therein without departing from the spirit of the invention or from the scope of the appended claims.

What I claim is:

1. A method of preserving airbags which comprises injecting therein a solution of glycerine containing an inert pigment and an oil which wets the pigment.

2. A method of preserving airbags which comprises injecting therein a solution of glycerine containing an inert pigment, an oil which wets the pigment and zinc oxide.

3. A method of preserving airbags which comprises injecting therein a solution of glycerine containing an emulsifiable pine distillate and an inert pigment.

4. A method of preserving airbags which comprises injecting therein a solution of glycerine containing an emulsifiable pine distillate and "asbestine".

5. A method of preserving airbags which comprises injecting therein a solution of glycerine containing an emulsifiable pine distillate, "asbestine" and zinc oxide.

6. A preserving material for the surfaces of heated rubber comprising glycerine, an inert pigment, an oil which wets the pigment and zinc oxide.

7. A material for preserving the surface of heated rubber which has approximately the following formula:

| | Per cent |
|---|---|
| Glycerine (—%) | 60 |
| Inert pigment | 39 |
| Emulsifiable oil | 1 |

8. A method of preserving rubber air containers which comprises injecting therein a solution comprising glycerine, an oil and a pigment which is wet by the oil.

In witness whereof, I have hereunto signed my name at Akron, in the county of Summit and State of Ohio, this 17 day of November, 1927.

GERALD D. MALLORY.